United States Patent [19]

Stahl et al.

[11] 4,402,576
[45] Sep. 6, 1983

[54] ADJUSTING DEVICE FOR THE STAGE OF AN OPTICAL INSTRUMENT

[75] Inventors: Werner Stahl; Walter Froböse, both of Solms-Oberndorf; Robert Lisfeld, Greifenstein-Ulm, all of Fed. Rep. of Germany

[73] Assignee: Ernst Leitz Wetzlar GmbH, Wetzlar, Fed. Rep. of Germany

[21] Appl. No.: 281,906

[22] Filed: Jul. 9, 1981

[30] Foreign Application Priority Data

Jul. 19, 1980 [DE] Fed. Rep. of Germany ....... 3027461

[51] Int. Cl.³ ............................................. G02B 21/26
[52] U.S. Cl. ................................................... 350/531
[58] Field of Search ...................... 350/531; 74/471 Y; 108/137, 143; 33/1 M; 353/27 R

[56] References Cited

U.S. PATENT DOCUMENTS 2,681,592 6/1954 Heine ................................. 350/531
4,189,953 2/1980 Volk ............................... 108/143 X

FOREIGN PATENT DOCUMENTS 1281762 10/1968 Fed. Rep. of Germany .
2233715 6/1973 Fed. Rep. of Germany .
2751207 5/1979 Fed. Rep. of Germany ...... 350/531

Primary Examiner—John K. Corbin
Assistant Examiner—Matthew W. Koren
Attorney, Agent, or Firm—Schwartz, Jeffery, Schwaab, Mack, Blumenthal & Koch

[57] ABSTRACT

An adjusting device for the specimen stage of an optical instrument such as a microscope or vernier measuring instrument comprising a pair of superposed slides mounted for movement in two mutually perpendicular coordinate directions perpendicular to the optical axis of the instrument with coaxial drive means for effecting fine adjustments of the positions of the slides and with a single, common release mechanism for simultaneously disengaging both drive means to facilitate rapid manual displacement of the slides to an approximate desired position.

11 Claims, 1 Drawing Figure

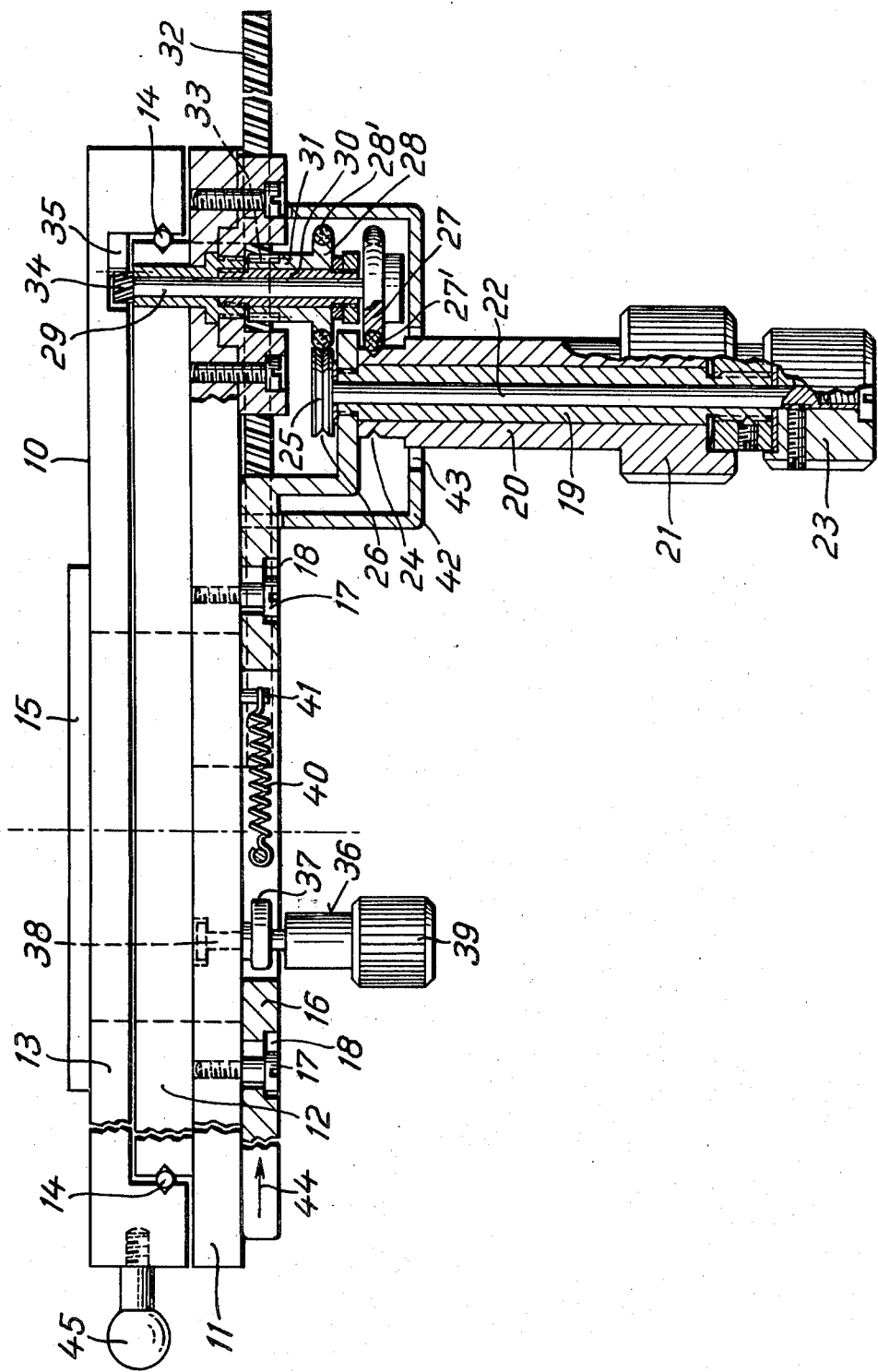

ADJUSTING DEVICE FOR THE STAGE OF AN OPTICAL INSTRUMENT

BACKGROUND OF THE INVENTION

The present invention relates to an adjusting device for the specimen stage of an optical instrument, such as a microscope or a measuring instrument, comprising a base plate and two slides arranged over each other on said base plate, said slides being adjustable in two horizontal coordinate directions by means of adjusting means drivingly connected with coaxial drive means extending in a direction parallel to the optical axis of the instrument.

German published application DE-A No. 2 233 715 discloses a specimen stage with a cross slide for incident light microscopes, wherein the cross slide may be moved by means of two pinion knobs arranged on the underside of the stage coaxially with and parallel to the optical axis. In this arrangement, two slides are supported on a guide plate and may be displaced horizontally in two coordinate directions. The displacement of the two slides is effected by rotation of the two coaxial pinion knobs, the shafts of which are each equipped at their upper ends with a pinion, said pinions each engaging a rack fastened to the slide involved. This known arrangement makes fine adjustment of the position of the object to be observed possible. However, rapid manual adjustment of the slides is not feasible with this arrangement.

German allowed application DE-B No. 1 281 762 discloses a coarse and fine adjusting device for an adjustable member, such as a vernier slide for measuring instruments, microscopes, coordinate boring machines and the like. In this device, a vernier slide displaceable in ball guideways on a base is fixedly joined with a nut member. In the nut member, a threaded ring which serves to bearingly support a round rod, is connected with a fine setting knob and arranged in an axially screwable manner. The rod is displaceable in a pillow block and may be clampingly secured by means of an excentric disk. With the excentric clamp released, the vernier slide may be brought rapidly into its approximate working position by simply pushing the fine adjusting knob, whereby the round rod slides freely in the bores of the legs of the pillow block and the bore of the excentric disk. When the round rod is securely clamped in the bores of the legs of the pillow block by means of the excentric disk, the position of the vernier slide is defined, whereupon a fine adjustment may be effected by rotating the fine adjusting knob connected with the threaded ring through the finely threaded nut member. This device makes it possible to achieve short adjusting times with a high accuracy, but only in one coordinate direction.

In optical instruments, such as microscopes used in the production of semiconductors to verify the exact configuration of masking elements, it is often necessary to displace the stage rapidly over long distances in both coordinate directions. In prior art devices, this requires considerable time.

SUMMARY OF THE INVENTION

It is an object of the present invention to provide an adjusting device for the stage of an optical instrument which enables rapid adjustment of the object to be viewed in two horizontal coordinate directions into the approximate examining position.

A further object of the present invention is to provide an adjusting device for the stage of an optical instrument which additionally enables precise fine adjustment in two horizontal coordinate directions of the position of the object to be viewed.

Another object of the present invention is to provide an adjusting device for the stage of an optical instrument which is simple to operate.

It is also an object of the present invention to provide an adjusting device for the stage of an optical instrument which may be used with a microscope, a measuring instrument or other similar instrument.

A still further object of the present invention is to provide an adjustment device for the stage of an optical instrument which enables release of the stage for the purpose of rapid manual displacement in both horizontal coordinate directions of the position of the specimen or object to be viewed by actuation of a single release mechanism.

Yet another object of the present invention is to provide an adjustment device for the stage of an optical instrument which enables stepless locking of the stage in a position which, within the limits, is infinitely variable.

These and other objects of the invention are achieved by providing an adjusting device for the specimen stage of an optical instrument comprising a base and two superposed slides, wherein the position of the slides is adjustable in two horizontal coordinate directions by means of adjusting means drivably connected to coaxial drive means extending parallel to the optical axis of the instrument and a single common release mechanism is provided for releasing the drive means in both coordinate directions to enable rapid manual displacement of the slides.

As noted above, a single common release device is provided for the drive means in both of the coordinate directions, to release the assembly for the purpose of the rapid manual displacement of the slides. With the assembly locked, fine adjustment of the position of both of the slides may thus be effected by actuating the coaxial drive means in mutually perpendicular directions, whereby very short displacement paths may be selected, thereby achieving high precision. The release of the assembly completely disengages the drive of both of the fine adjustment means so that rapid displacement with correspondingly short setting times in both coordinate directions may be performed and the object may thus be brought rapidly into an approximate position for observation. It should be understood that a similar arrangement may also be provided for object stages having coarse and fine adjusting means, so that then coarse, fine and rapid adjusting means will be available.

The release device advantageously includes a mechanism actuable by a rotating knob, which mechanism is drivingly connected with the bearing locations of the fine adjustment drive means for the purpose of effecting parallel displacement or disengagement thereof, and which may be disposed adjacent the drive means. To release the fine adjustment, it is sufficient to actuate the rotating knob to separate the drives. This may be effected conveniently by using an eccentric disk as the mechanism to move an abutting gib against the force of a spring acting upon the gib, one end of said gib being connected with the bearing location for the drive means of the specimen stage. The release may also be effected by other means, for example by pulling out the pinion knobs in the axial direction or pivoting away with a lever. The essential fact is that the separation of the driving means may be effected with a single mechanism for both coordinate directions together.

According to a preferred embodiment of the invention, known friction wheel drives are arranged between the drive shafts of the drive means for the fine adjustment and the adjusting means for adjusting the position the slides and thus the stage. In this manner, during the locking of the assembly for the purpose of fine setting a stepless clamping effect is obtained, without the displacement that may occur due to the distance between teeth in the case of a rack and pinion drive. Furthermore, a very uniform motion is achieved without play or lost motion. It is also possible to eliminate the friction wheels and to mount the adjusting means for the slides directly on the slides and on the shafts of the drive means for fine adjustment.

As the adjusting means for displacing the slides racks and pinions may be provided in a conventional manner. In such a case, the racks may be fixedly connected with the slides, while the pinions are disposed on a shaft extending parallel and offset in height with respect to the longitudinal axis of the shaft of the drive means and a sleeve surrounding the shaft of the drive means. Alternatively, the slides may be displaced by using only a friction wheel arrangement.

BRIEF DESCRIPTION OF THE DRAWINGS

The invention will be described in further detail with reference to the accompanying drawing which is a schematic side elevation in partial section of an adjusting device according to the present invention.

DETAILED DESCRIPTION OF A PREFERRED EMBODIMENT

The specimen stage 10 shown in the drawing comprises a base plate 11, rigidly mounted on a pedestal (not shown) together with a lower slide 12 and an upper slide 13. The lower slide 12 may be displaced on the base plate 11 in the plane of the drawing (y coordinate), and the upper slide 13 may be displaced on the lower slide 12 on balls 14, perpendicular to the drawing, i.e. in a direction passing perpendicularly through the plane of the drawing (x coordinate). Upper slide 13 carries the object to be examined 15. Insofar the arrangement corresponds to known mechanical stages which are displaceable horizontally in two coordinate directions.

A gib 16 is mounted on base plate 11 by means of screws 17 in such a way that it may be slid in the y direction, for which purpose recesses 18 are provided in the gib 16. The gib is bent at one end in the shape of a Z and carries a bushing 19, surrounded by a hollow sleeve 20 of a first drive means 21, shown having the configuration of a knurled knob. A shaft 22 of a second drive means 23 is rotatably mounted inside bushing 19, thereby establishing a coaxial arrangement of the two drive means 21, 23. Hollow sleeve 20 is provided at its end remote from the drive means 21 with a circumferential V-shaped groove 24. A friction wheel 25 is fastened to the end of shaft 22 remote from drive means 23, said friction wheel also being provided with a V-shaped groove 26. A lower friction wheel 27 engages groove 24 on hollow sleeve 20 and an upper friction wheel 28 engages groove 26 in friction wheel 25; each of wheels 27 and 28 being equipped with a rubber ring 27', 28'. Lower friction wheel 27 is secured to a shaft 29, rotatably supported in a bushing 30 fixedly mounted on the base plate 11. Upper friction wheel 28 is rotatably supported by means of a bearing sleeve 31 on bushing 30.

A lower rack 32 is mounted on slide 12, said lower rack engaging a lower pinion 33 provided on the upper end of the bearing sleeve 31. An upper pinion 34 on the end of the drive shaft 29 mates with an upper rack 35 mounted on slide 13. Groove 24 and the friction roll 25, together with lower friction wheel 27 and upper friction wheel 28, constitute two friction wheel gears, while the pinions 33, 34 and the racks 32, 35 serve in the present case as adjusting means for displacing the slides 12, 13 and thus the stage 10.

A mechanism with an eccentric disk 37, is arranged in a recess of the gib 16, as the release device 36; the shaft 38 of said release device being rotatably supported on the base plate 11 and actuated by means of a rotating knob 39. One of the ends of a spring 40 is fastened to gib 16, and the other end of spring 40 is secured to a pin 41 fixedly mounted on the base plate 11. The friction wheel gears protruding below the base plate 11 are surrounded by a cover 42, having an opening 43 to receive the shafts of the drive means, said opening being larger than the diameter of the drive means shafts.

To effect fine adjustments of the position of stage 10, lower friction wheel 27 with the upper pinion 34 which engages upper rack 35 is rotated by turning the first drive means 21 thereby displacing the slide 13 in a direction perpendicular to the plane of the drawing. By actuating drive means 23, lower pinion 33 mounted on bearing sleeve 30 engaging lower rack 32 is rotated thereby displacing the slide 12 in a direction parallel to the plane of the drawing. As the result of the tension exerted by spring 40 in the direction of the arrow 44, gib 16 is urged to the position shown in the drawing, wherein the groove 24 and the friction wheel 25 engage the friction wheels 27 and 28, respectively.

Rapid displacements merely require actuation of the rotating knob 39, whereby the gib 16 is displaced by the excentric disk 30 against the tension of the spring 40 and slides along the bottom of base plate 11, while being guided by the pin and slit guideways formed by screws 17 and recesses 18. In this way, the drive means for effecting fine adjustment are disengaged so that the slides 12, 13 may be rapidly displaced in both coordinate directions by means of a hand grip 45 mounted on upper slide 13, and the object to be examined 15 may be brought into the desired position.

The foregoing description has been set forth merely as an illustrative example of the invention and is not intended to be limiting. Since modifications of the described embodiments incorporating the spirit and substance of the invention may occur to persons skilled in the art, the scope of the invention should be limited solely with respect to the following claims.

We claim:

1. An adjustable stage for an optical instrument comprising:
   a base;
   a first slide member mounted on said base for movement in a first coordinate direction;
   a second slide member mounted on said first slide member for movement in a second coordinate direction;
   first adjusting means for adjusting the position of said first slide member;
   second adjusting means for adjusting the position of said second slide member;

first drive means drivingly engaging said first adjusting means for driving said first adjusting means;

second drive means drivingly engaging said second adjusting means for driving said second adjusting means; and release means for selectively simultaneously moving said first drive means out of driving engagement with said first adjustment means and said second drive means out of driving engagement with said second adjustment means to enable rapid manual displacement of said first and second slides in said first and second coordinate directions.

2. A stage according to claim 1 wherein said first adjusting means comprises a sleeve rotatably mounted on the outside of a bushing fixedly secured to said base, and a pinion on said sleeve drivably engaging a rack on said first slide member; and said second adjusting means comprises a shaft rotatably mounted on the inside of said bushing and a pinion on said shaft drivably engaging a rack on said second slide member, said sleeve and shaft being coaxial.

3. A stage according to claim 1 wherein said release means comprises a gib slidably mounted on said base and a rotatable eccentric disk operable to slide said gib; said first and second drive means being mounted on said gib whereby movement of said gib simultaneously displaces said first and second drive means.

4. A stage according to claim 3 further comprising a tension spring for urging said gib to a position where said first and second drive means drivingly engage said first and second adjusting means respectively; one end of said spring being connected to said gib and the other end of said spring being secured to a pin mounted on said base.

5. A stage according to claim 1 wherein said first drive means comprises a shaft rotatably mounted on the inside of a bushing secured to a movable support member and said second drive means comprises a sleeve rotatably mounted on the outside of said bushing; said shaft and said sleeve being coaxial and each being provided with grip means to facilitate manual rotation thereof.

6. A stage according to claim 1 wherein said first and second drive means engage said first and second adjustment means respectively through friction wheel assemblies.

7. A stage according to claim 6 wherein each friction wheel assembly comprises a friction wheel on the adjustment means, a rubber ring around the periphery of the friction wheel and a mating circumferential groove on the drive means.

8. A stage according to claim 1 further comprising spring means for urging said first and second drive means into driving engagement with said first and second adjustment means respectively.

9. A stage according to claim 5 wherein said first and second drive means are coaxial and extend parallel to the optical axis of the instrument.

10. A stage according to claim 1 wherein said first slide member is moveable in a direction perpendicular to the direction in which said second slide member is moveable, and both slides move perpendicular to the optical axis of the instrument.

11. A stage according to claim 1 further comprising grip means for facilitating manual displacement of said first and second slide members when said first and second drive means are disengaged from said first and second adjusting means.

* * * * *